May 24, 1927. Re. 16,635

F. W. HOBAN

TELEPHONE ATTACHMENT

Original Filed Feb. 12, 1921 2 Sheets-Sheet 1

INVENTOR
Fairfield W. Hoban
BY
Charles H. Kesler
his ATTORNEY

May 24, 1927. Re. 16,635

F. W. HOBAN

TELEPHONE ATTACHMENT

Original Filed Feb. 12, 1921 2 Sheets-Sheet 2

INVENTOR
Fairfield W. Hoban
BY
Charles H. Kesler
his ATTORNEY

Reissued May 24, 1927. Re. 16,635

UNITED STATES PATENT OFFICE.

FAIRFIELD W. HOBAN, OF NEW YORK, N. Y., ASSIGNOR, BY MESNE ASSIGNMENTS, TO HOLDAPHONE, INCORPORATED, OF NEW YORK, N. Y., A CORPORATION OF NEW YORK.

TELEPHONE ATTACHMENT.

Original No. 1,566,212, dated December 15, 1925, Serial No. 444,415, filed February 12, 1921. Application for reissue filed March 8, 1927. Serial No. 173,729.

This invention relates to attachments for telephones, and has for one of its objects to provide means for supporting the receiver, thus freeing the hand which is usually employed for holding the receiver to the ear.

Another object is to provide an attachment of this kind on which the receiver may be nicely adjusted to exactly register with the ear of the user when talking into the mouth piece. A further object is to provide improved means for retaining the receiver-supporting arm in either of its positions, that is, when not in use, as well as when in use. Further objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views.

Figure 1:
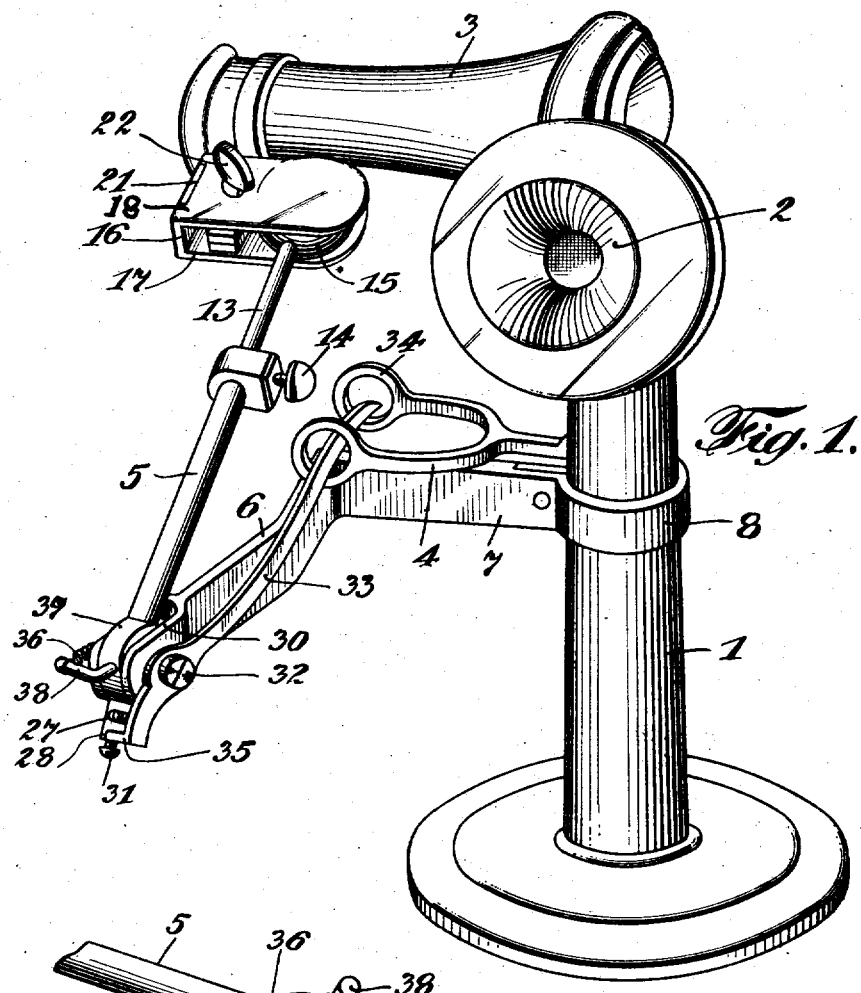
Figure 1 is a perspective view of a desk telephone showing my improved attachment applied thereto, the receiver-supporting arm being shown in the position it occupies when the telephone is not in use.
Figure 5:
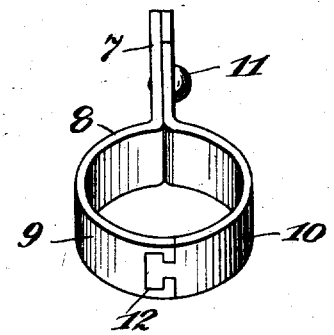
Figure 5 is a detailed perspective view of the clamp for securing the bracket to the standard of the telephone.
Figure 2:
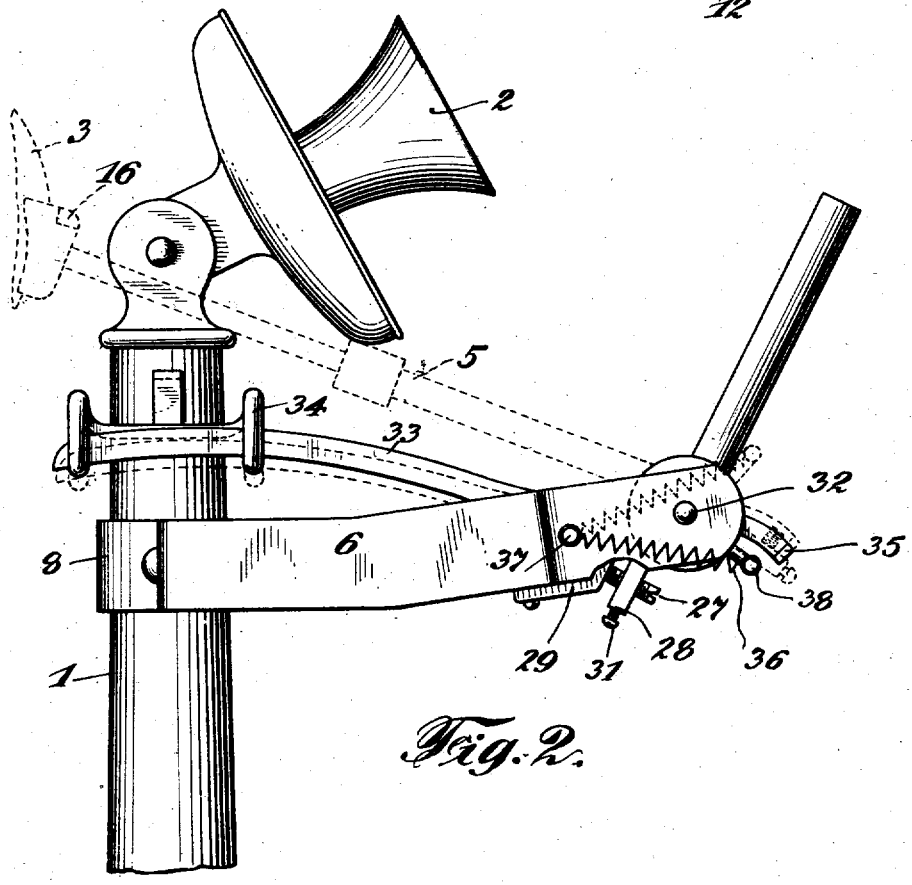
Figure 2 is a fragmentary side view of the telephone and attachment showing the receiver-supporting arm in position for use in solid lines, and in the position it occupies when not in use in dotted lines, the corresponding positions of the receiver hook of the telephone being also indicated.

In Figures 1 and 2, an ordinary desk telephone is shown with the usual standard 1, mouth piece 2, receiver 3, and receiver-supporting hook 4. The receiver is attached to a supporting arm 5 which is pivoted to an angularly bent arm 6 of a bracket 7 which is fastened around the standard 1 of the telephone just below the hook 4 by means of a clamp 8. As illustrated in Figure 5, said clamp 8 consists of supplemental semi-circular members 9 and 10, one of which may be integral with the bracket 7, while the other is preferably detachably secured thereto by a screw or bolt 11. The free ends of the members 9 and 10 of the clamp are interlocked at 12, preferably by the dove-tail or T-connection shown, which unites said outer ends of the members when their inner end portions are connected by the screw 11, but which permits the separable member 10 to be entirely removed when said screw 11 is taken out in order to permit the ready application of the clamp about the standard of a telephone.

Figure 4:
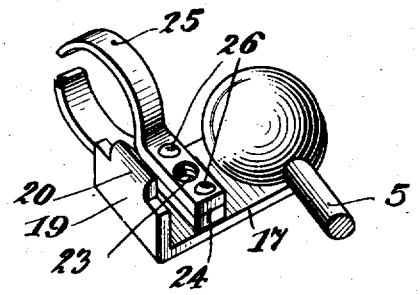
Figure 4 is a detailed perspective view of part of the ball clamp at the free end of the receiver-supporting arm.

In order to permit the receiver to be adjusted so as to properly register with the ear of different users when they are speaking into the mouth piece of the telephone, the arm 5 is provided with a telescopic extension 13 which may be set at different lengths by a clamping screw 14, and a ball 15 is formed at the extremity of said extension arm 13 to fit in a clamp 16 to which the receiver is secured. Said ball clamp 16, as shown in Figures 1 and 4, comprises supplemental jaw members 17 and 18 having a concave portion at one end to engage the ball 15, while their other ends are spaced apart by an angularly bent portion 19 on one jaw interlocking with the other jaw by means of a tongue 20 on said part 19 fitting in a notch 21 in the jaw 18. Said interlocking connection between the jaws retains them in proper alignment when they are clamped together about the ball 15 by means of a set screw 22 which passes through the jaw 18 and engages a socket 23 in the shanks 24 of the receiver clamp 25, which shanks are secured to the inner face of the jaw 17 of the ball clamp by screws 26, Figure 4.

The receiver may be further adjusted by means of a set screw 27 on a projecting lug 28 at the pivoted end of the arm 5, said set screw being adapted to engage a stop 29 extending into the bifurcated end portion 30 of the bent portion 6 of the bracket, so that by adjusting said set screw the forward swing of the receiver-supporting arm may be arrested at different points. The set screw 27 may be fixed in adjusted position by a locking screw 31. It will thus be seen that three different means of adjusting the receiver are provided, namely, the telescopic extension arm 13, the universal ball joint 15, and the adjusting screw 27.

Pivoted on the bent portion 6 of the bracket 7, preferably by the same pivot bolt 32 which serves as pivot for the arm 5, is a lever 33 which extends along said bent portion 6 of the bracket and has its end passed through the loops 34 at the end of the receiver hook 4 of the telephone. At the other side of its pivot the lever 33 has a bent tongue 35 extending into the path of the lug 28 on the arm 5. The arrangement of said lever, tongue, and lug is such that when the arm 5, which supports the receiver, is swung backward, as shown in Figure 1, and in dotted lines in Figure 2, the lug 28 engages the tongue 35 and moves the lever 33 and receiver hook 4 downward to cut off the circuit to the telephone, as is usually done when the receiver is placed on said hook.

Figure 3:
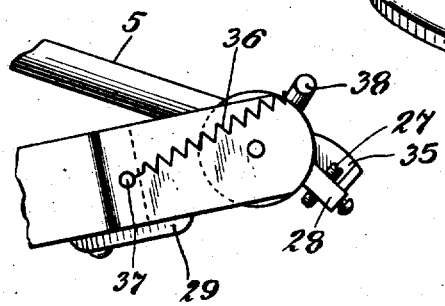
Figure 3 is a detailed side view of the outer end of the bracket of the attachment, showing the receiver-supporting arm back in idle position.

To insure the proper retention of the receiver-supporting arm in its rearward or idle position for maintaining the telephone circuit normally broken, a coiled spring 36 is fastened at one end to the bent portion 6 of the bracket at 37, and at the other end to a bent lug 38 on the pivot hub 39 of the arm 5, the arrangement of said lug 38 being such that it will be positioned at one side of the pivot 32 of said arm when the latter is swung backward to its idle position, as shown in Figures 1 and 3, and in dotted lines in Figure 2. When the arm 5 is swung forward, as shown in solid lines in Figure 2, the lug 38 is brought to a position at the other side of the pivot 32, so that the spring 36 then serves to hold the arm in position to support the receiver in line with the ear of the user. It will be noted that the spring 36 will move the arm 5 in either direction after the latter has been manually swung far enough to bring the lug 38 past the line of the pivot 32 and point of connection 37 of the inner end of said spring. This insures the proper movement of the arm 5 rearward to its fullest extent for cutting off the telephone circuit, even though said arm is not pushed all the way back manually. Obviously, the arrangement of the spring 36 will also insure the movement of the receiver-supporting arm to the limit of its forward movement for bringing the receiver into proper register with the ear of the user, and will hold said arm in that position while the instrument is being used.

Having thus fully described my invention, what I claim as new, and desire to secure by Letters Patent, is:—

1. In a telephone attachment, the combination with a bracket and means for holding it in forwardly extending, associated relation with a telephone instrument, of a receiver carrying arm pivoted on the front end of the bracket and swinging between a position upwardly and rearwardly of said bracket and a position forwardly and upwardly of said bracket, a lever fulcrumed on the front end of the bracket and extending rearwardly alongside the same in a position to engage the receiver hook of an instrument, and means carried by the lower end of the receiver carrying arm and operating on the front end of the lever for moving the lever.

2. In a telephone attachment, the combination with a bracket and means for holding it in associated relation with a telephone instrument, of a receiver carrying arm pivoted to the bracket, and a lever pivoted between its ends on the bracket and coaxially with the arm, one arm of the lever being in the path of the arm, the other arm of the lever engaging the telephone receiver hook of the instrument to operate the same when said lever is moved by the arm.

3. A telephone attachment comprising a bracket adapted to be operatively associated with a telephone instrument and extending forwardly, a receiver carrying arm pivoted at the lower end thereof to the front portion of said bracket and swinging forwardly and rearwardly above the pivot thereof into operative and inoperative positions, a lever pivoted on the front portion of said bracket and extending rearwardly in a position to engage the receiver hook of said instrument, and means carried by the lower portion of said arm and operating on the adjacent portion of said lever for moving the lever.

4. A telephone attachment comprising a bracket adapted to be operatively associated with a telephone instrument, a receiver carrying arm pivoted at the lower end thereof to said bracket and adapted to swing forwardly and rearwardly in a vertical plane, and a lever pivoted at the forward end thereof to said bracket adjacent to the lower end of said arm and extending rearwardly into engagement with the receiver hook of said instrument; said arm and said lever adjacent to the pivoted ends thereof having portions thereon lying in the path of travel of each other and adapted to engage when said arm is swung to inoperative position for moving said lever to depress said hook.

5. A telephone attachment comprising a bracket adapted to be operatively associated with a telephone instrument, a receiver carrying member pivoted to said bracket and swinging vertically thereon between operative and inoperative positions, a member for controlling the receiver hook of said telephone instrument pivoted to said bracket coaxially with said receiver carrying member, and a portion carried by one of said members and extending laterally into the path of travel of the other of said members and engaged thereby to actuate said hook controlling member when said receiver carrying member is actuated.

6. A telephone attachment comprising a bracket adapted to be operatively associated with a telephone instrument, a receiver carrying arm pivoted at its lower end to said bracket and swinging vertically thereon between operative and inoperative positions, a lever pivoted at its outer end to said bracket laterally of and in close relation to the lower portion of said arm for vertical movement, and extending rearwardly in position to engage the receiver hook of said telephone instrument; said arm and said lever adjacent to the pivots thereof having portions carried thereby arranged in the path of travel of each other and adapted to engage when said arm is swung to inoperative position for moving said lever to depress said hook.

7. A telephone attachment comprising a bracket adapted to be operatively associated with a telephone instrument, and extending forwardly, a receiver carrying arm pivoted at the lower end thereof to the forward portion of said bracket and swinging vertically thereon between operative and inoperative positions, a lever pivoted at the outer end thereof to the forward portion of said bracket coaxially with and in close relation to said arm, and extending rearwardly in position to engage the receiver hook of the telephone instrument, and a portion extending laterally from said lever adjacent to the pivot thereof into the path of travel of said arm and actuated thereby to control said receiver hook.

8. A telephone attachment comprising a bracket adapted to be operatively associated with a telephone instrument, a receiver carrying member pivoted at the lower end thereof to said bracket and adapted to swing vertically to opposite sides of the pivot thereof into operative and inoperative positions, means for supporting the weight of said member in its operative and inoperative positions, and a resilient member connected to said receiver carrying member to swing transversely of the pivot thereof and serving to facilitate the movement of said receiver carrying member between said positions and augmenting the weight thereof in each of said positions to retain the same therein in engagement with said supporting means.

9. A telephone attachment comprising a bracket adapted to be operatively associated with a telephone instrument, a receiver carrying arm pivoted at the lower end thereof to said bracket and swinging vertically thereon between operative and inoperative positions, a stop on said bracket adapted to engage said arm to support the same in operative position, means actuated by said arm for controlling the receiver hook of said telephone instrument, and a resilient member connected to said arm to swing transversely of the pivot thereof and serving to facilitate the movement of said arm between said positions, and maintain the same in its operative position in engagement with said stop and in its inoperative position in engagement with said hook controlling means to maintain said hook depressed.

10. A telephone attachment comprising a bracket adapted to be operatively associated with a telephone instrument, a receiver carrying member pivoted at the lower end thereof to said bracket and swinging vertically thereon between operative and inoperative positions, a stop on said bracket adapted to engage said member to support the same in operative position, a member pivoted to said bracket for vertical movement and extending rearwardly in position to engage the receiver hook of said telephone instrument, a portion on one of said members extending laterally into the path of travel of the other of said members and engaged thereby to cause one member to actuate the other, and a resilient member connecting said bracket and said receiver carrying member, and serving to swing said receiver carrying member between said positions and maintain the same in its operative position in engagement with said stop and in its inoperative position in engagement with said hook engaging member to retain the same depressed.

11. A telephone attachment comprising a bracket adapted to be operatively associated with a telephone instrument, and extending forwardly, a receiver carrying arm pivoted at the lower end thereof to the forward portion of said bracket and swinging vertically thereon between operative and inoperative positions, a lever pivoted at the outer end thereof to the forward portion of said bracket coaxially with said arm and extending rearwardly in position to engage the receiver hook of said telephone instrument; said arm and said lever adjacent to the pivot thereof having portions thereon lying in the path of travel of each other and adapted to engage when said arm is swung to inoperative position, a stop on said bracket adapted to engage said arm to support the same in its operative position, and a resilient member connecting said bracket and said arm, and serving to swing said arm between said positions and maintain the same in its operative position in engagement with said stop and in its inoperative position in engagement with said lever to retain the same in depressed position.

12. A telephone attachment comprising a bracket adapted to be operatively associated with a telephone instrument, a receiver carrying arm pivoted at the lower end thereof to said bracket and adapted to swing over the pivot thereof into operative and inoperative positions, means for supporting the weight of said arm in its operative position, a member movably mounted on said bracket independently of said arm, extending into engagement with the receiver hook of said instrument and adapted to be engaged by said arm to move the same to depress said hook, and a resilient member serving to facilitate the movement of said arm between said positions and augmenting the weight thereof to maintain the same in engagement with said stop in the operative position thereof, and maintaining said arm in engagement with said hook controlling member in the inoperative position thereof, and said hook controlling member depressed.

13. A telephone attachment comprising a bracket adapted to be operatively associated with a telephone instrument, a receiver carrying member pivoted at the lower end thereof to said bracket and adapted to swing over the pivot thereof into operative and inoperative positions, a stop on said bracket adapted to engage said arm to support the same in its operative position, a hook controlling member movably mounted on said bracket and serving to support said receiver carying member in its inoperative position at the opposite side of said pivot, and a resilient member connected to said receiver carrying member and serving to facilitate the movement thereof between said positions, and augmenting the weight thereof in each of said positions to retain the same in engagement with said stop and said hook controlling member, and in said inoperative position to maintain said hook controlling member depressed.

Signed at New York, in the county and State of New York, this 7th day of March, one thousand nine hundred and twenty-seven.

FAIRFIELD W. HOBAN.